United States Patent [19]

Chang et al.

[11] Patent Number: 5,299,678
[45] Date of Patent: Apr. 5, 1994

[54] LIMIT SWITCH MECHANISM FOR GARAGE DOOR OPENER

[75] Inventors: James S. Chang, Arlington Heights; Mark D. Siegler, Brookfield; Douglas R. Turner, Arlington Heights, all of Ill.

[73] Assignee: The Chamberlain Group, Inc., Elmhurst, Ill.

[21] Appl. No.: 105,780

[22] Filed: Aug. 12, 1993

Related U.S. Application Data

[63] Continuation of Ser. No. 702,776, May 17, 1991, abandoned.

[51] Int. Cl.[5] .................. H02P 3/00; E05F 15/00; F16D 71/00
[52] U.S. Cl. .................. 192/141; 49/199; 192/142 R; 318/266
[58] Field of Search .............. 192/141, 142 R, 143; 49/199, 139; 200/61.62; 318/470, 266; 74/89.15

[56] References Cited

U.S. PATENT DOCUMENTS

| | | |
|---|---|---|
| 1,457,367 | 6/1923 | Hubers . |
| 1,788,302 | 1/1931 | Hummel . |
| 2,504,018 | 4/1950 | Gibson et al. . |
| 3,209,090 | 9/1965 | Fry ........................ 200/47 |
| 3,341,760 | 9/1967 | Fry ........................ 318/266 X |
| 3,474,317 | 10/1969 | Delaney ................... 318/266 |
| 4,131,830 | 12/1978 | Lee et al. ................. 49/139 X |
| 4,628,636 | 12/1986 | Folger ..................... 49/199 |
| 4,721,196 | 1/1988 | Layer et al. .............. 192/141 |
| 4,838,403 | 6/1989 | Layer ...................... 192/141 |
| 4,977,788 | 12/1990 | Besemann ................ 74/89.15 X |

FOREIGN PATENT DOCUMENTS 503865  6/1951  Belgium .................. 192/141

OTHER PUBLICATIONS

IBM Technical Disclosure Bulletin, vol. 28, No. 1, Jun. 1985, p. 133.

Primary Examiner—Rodney H. Bonck
Attorney, Agent, or Firm—Fitch, Even, Tabin & Flannery

[57] ABSTRACT

An adjustable limit switch mechanism for controlling the operation of an electric motor of a garage door opener over a selected range of movement including a motor driven threaded shaft supporting at least one switch actuator which is adjustably positionable and restrained from rotary movement while being axially translated by rotation of the shaft. A limit switch is mounted adjacent the threaded shaft so as to be actuated as the switch actuator is translated axially on the shaft.

9 Claims, 3 Drawing Sheets

LIMIT SWITCH MECHANISM FOR GARAGE DOOR OPENER

This application is a continuation of application Ser. No. 07/702,776 filed May 17, 1991 and now abandoned.

BACKGROUND OF THE INVENTION

1. Field of the Invention

This invention relates, generally, to motor control switches and, more specifically, to a limit switch mechanism for controlling the electric motor which powers an electric garage door opening and closing mechanism. There are many different types of so-called limit switches used in regulating and controlling the motor of a garage door opener. There are various safety requirements as well as installation problems associated with the varying structure and circumstances encountered at the site at which the garage door opener is to be installed.

Apart from the safety switches, which are necessary to control movement of the door when an object is encountered, it is also necessary to have controls which limit the movement of the garage door from between the fully raised and the fully closed positions. Because of the variations in door structures and the circumstances relating to the installation of the opener mechanism with its associated connections to the garage door, it is necessary that means be included in the limit switch mechanism to permit adjustment of the switching points so that they will be synchronized with the opened or closed position of the door.

In general the garage door switches have been complicated and difficult to install. The present invention involves a simple mechanism driven by the electric motor for the opener which has means for easily and simply adjusting the desired switch operating positions while leaving the limit switches themselves fixedly mounted with respect to their supporting frame.

2. Description of the Prior Art

The prior art includes a number of patents which disclose the broad idea of utilizing a motor driven threaded shaft with an axially translatable actuator to control other operations. Among this prior art is Fry U.S. Pat. No. 3,209,090, Hummel U.S. Pat. No. 1,788,302, and Hubers U.S. Pat. No. 1,457,367. The mechanisms disclosed in the above cited patents are relatively complex. The patent to Hubers discloses a split switch actuator which travels axially along a motor driven shaft and which may be repositioned by disengaging the switch actuator from the threaded shaft. Other prior art patents showing similar actuators travelling on motor driven shafts are Gibson et at. U.S. Pat. No. 2,504,018, Layer U.S. Pat. No. 4,838,403, and Layer et al. U.S. Pat. No. 4,721,196. These last cited patents disclose complex mechanisms for operating mechanical devices in general rather than switching applications of the kind herein involved.

SUMMARY OF THE INVENTION

The present invention provides a limit switch mechanism for use with a garage door opener which is driven by the door operating motor and includes a threaded shaft supporting one or more threaded switch actuators which are translated axially by rotation of the shaft. The switch actuators are restrained from rotating and guided in their translational movement by spring biased restraining means which is mounted for pivotal movement on a shaft parallel to the threaded shaft. The restraining means is formed with an edge which extends radially with respect to the threaded shaft and engages slots formed on the switch actuators. This engagement between the restraining means and the switch actuators prevents rotation of the actuators so that rotation of the threaded shaft causes the actuators to move axially thereon into engagement with the control means on one or more limit switches mounted in proximity to the threaded shaft. When it is desirable to adjust the point at which the limit switches will be actuated, the restraining means is simply pivoted out of engagement with the switch actuators and the actuators may be rotated to re-position them with respect to the threaded shaft. This provides a simple mechanism which may be mounted with the garage door opener and easily adjusted following the installation of the garage door opener.

Accordingly, it is an object of the present invention to provide a limit switch mechanism which is easily adjustable to control the operation of an electric motor over a selected range of movement.

It is a further object of the present invention to provide an improved limit switch mechanism including a motor driven threaded shaft having one or more switch actuator nuts mounted thereon selectively engageable by means for restraining rotary motion of said actuator nuts while they are translated axially on the threaded shaft.

Another object of the present invention is to provide improved limit switch mechanism for controlling two limit switches associated with a motor circuit using a motor driven threaded shaft having two switch actuating nuts which are moveable into and out of switch operating position as such actuator nuts are translated axially along the shaft while such nuts are being restrained from rotation by selectively engageable means.

Other objects and advantages of the present invention will be readily apparent from the following description of the various embodiments thereof taken in conjunction with the accompanying drawings:

DETAILED DESCRIPTION OF THE PREFERRED EMBODIMENTS

Figure 1:
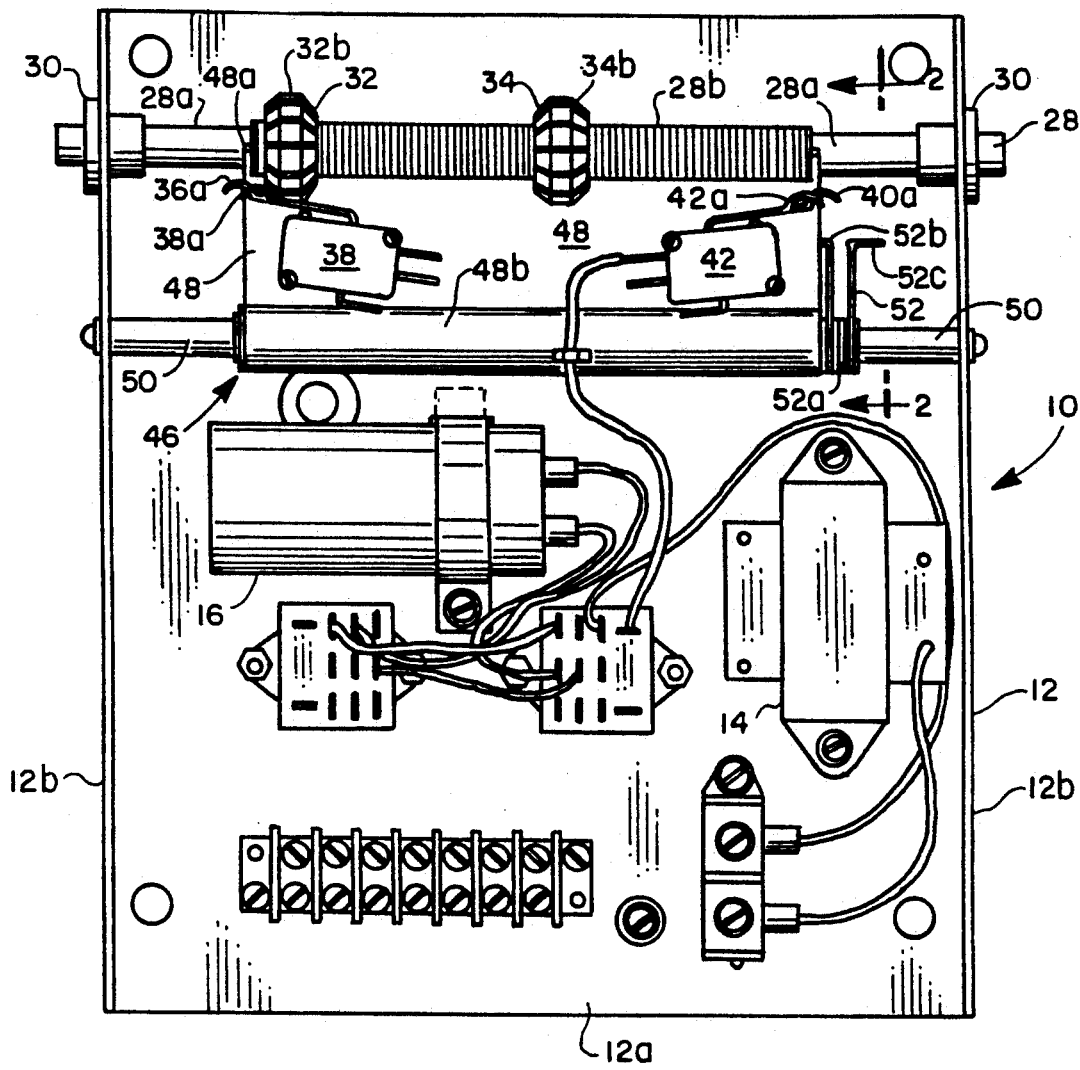
FIG. 1 is a plane view of a limit switch mechanism for a garage door opener embodying the invention.
Figure 4:
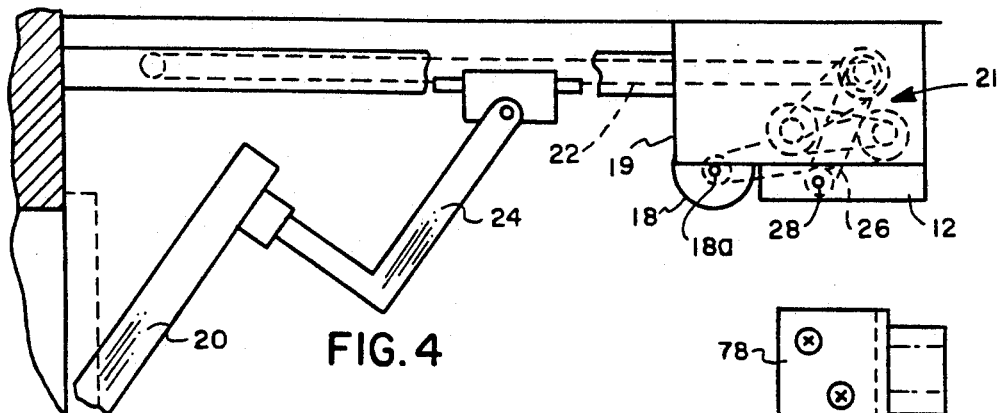
FIG. 4 is a schematic showing of a garage door opener including the limit switch mechanism of FIGS. 1-3.
Figure 6:
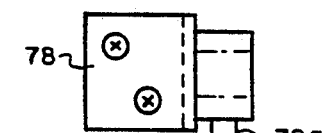
FIG. 6 is an enlarged fragmentary elevational view of a portion of a limit switch mechanism of the embodiment shown in FIG. 5.
Figure 7:
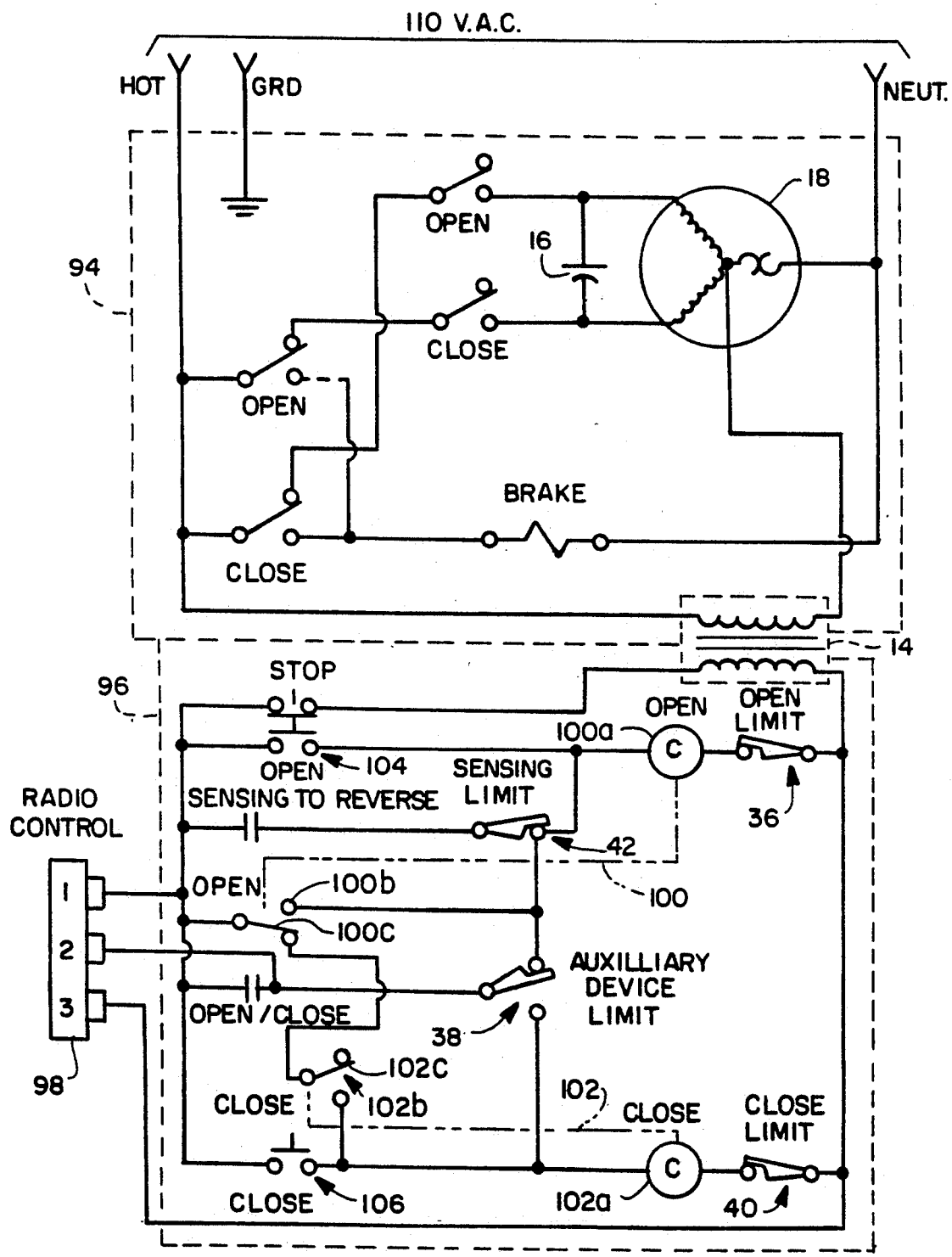
FIG. 7 is a schematic diagram of a typical garage door opener circuit in which the limit switch mechanism of the instant invention is employed.

Referring to the drawings, there is shown in FIG. 1 a limit switch mechanism which is designated generally by the reference numeral 10. The limit switch mechanism 10 includes a frame 12 having a bottom portion 12a and sidewalls 12b. Mounted on the bottom portion 12a are various electrical components including a transformer 14 and a capacitor 16, which will be discussed in greater detail in connection with the schematic diagram of FIG. 7 showing the operating circuit for a reversible drive motor 18. The motor 18 is drivingly connected to open a garage door 20, as shown in FIG. 4. The motor 18 has an output shaft 18a which drives a series of endless link chains designated generally by reference numeral 21. The motor 18 and the interconnecting link chains 21 provide a relatively low speed drive to an endless link chain 22 which is connected to a lever arm 24 to raise and lower the garage door 20 as the endless chain 22 is moved in one direction or the other. The specific arrangement of the motor 18 and the interconnecting means to raise and lower the garage door 20 form no part of the present invention, it being understood that the limit switch mechanism 10 of the present invention would be applicable to any type of motor operated garage door opener, whether employing a chain or worm type of drive or some other mechanism.

As shown in FIG. 4, the frame 12 is mounted adjacent to the motor 18 on a drive unit support 19, and there is provided an endless chain 26 which drives a shaft 28, which is a part of the limit switch mechanism 10. The chain 26 is driven from the output of the link chains 21, which also drives the chain 22.

Referring to FIG. 1, the shaft 28, which is driven by chain 26, is shown extending through the sidewalls 12b of the frame 12. Journal bearings 30 are provided in the sidewalls 12b to mount the shaft 28 for rotation. The shaft 28 includes unthreaded end portions 28a and a threaded central portion 28b. Received on the threaded portion 28b are switch actuators 32 and 34 which are substantially identical in size and shape, having central hub portions 32a and 34a, respectively, which support peripheral portions 32b and 34b, respectively. The peripheral portions 32b and 34b are formed with radially extending slots 32c and 34c.

Mounted on the bottom portion 12a of the frame 12 adjacent the shaft 28 are limit switches 36, 38, 40 and 42. The limit switches 36, 38, 40 and 42 are provided respectively with flexible control levers 36a, 38a, 40a and 42a, which actuate their respective limit switches in a manner known in the art when deflected. The control levers are positioned in the path of the switch actuators 32 and 43.

Figure 2:
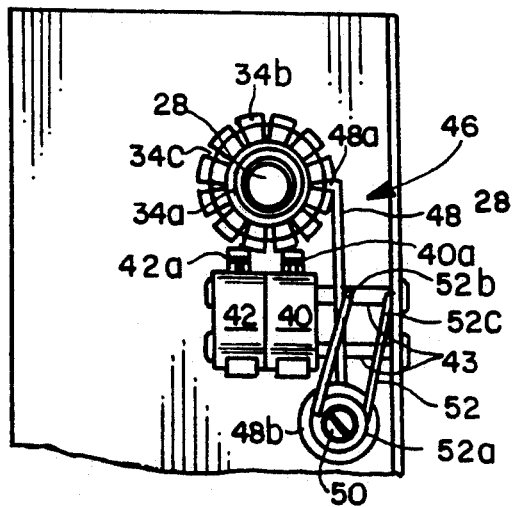
FIG. 2 is a fragmentary sectional view taken on line 2—2 of FIG. 1.

In order for the switch actuators 32 and 34 to engage the various switch control levers 36a, 38a, 40a and 42a at a selected point in time with respect to the travel of the endless chain 22, it is necessary to provide means for adjusting the point at which the switch actuators 32 and 34 engage the switch control levers. This adjustment is accomplished by rotating the switch actuators 32 and 34 with respect to the shaft 28, to move the switch actuators 32 and 34 axially along the shaft 28. Once the switch actuators 32 and 34 have been adjusted to the proper positions, it is necessary to provide means for limiting the rotation of the switch actuators 32 and 43 with respect to the shaft 28. This function of limiting the rotation of the actuators 32 and 34 is accomplished by a latch means 46 which includes a pivotally mounted plate 48 and a torsion spring 52 by a second shaft 50. This plate 48 includes a switch actuator restraining means or edge 48a which is disposed along one edge of the plate 48 and extends generally radially with respect to the shaft 28, as best shown in FIG. 2. The restraining portion or edge 48a engages in one of the slots 32c and 34 c, to perform the function of restraining the switch actuators 32 and 34 from rotating with respect to the shaft 28. The shaft 50 is supported in aligned openings in the sidewalls 12a of the frame 12.

The plate 48 is formed along the edge remote from the restraining portion 48a with a tubular portion 48b which receives the shaft 50 and mounts the plate 48 for pivotal movement about the axis of shaft 50 which extends parallel to the axis of the shaft 28.

As best shown in FIG. 1, the torsion spring 52 is formed with a coiled portion 52a received on the shaft 50 and with ends 52b and 52c. End 52c engages the frame 12 and the end 52b extends beneath the plate 48, with the spring being tensioned to bias the plate 48 in a counterclockwise direction as seen in FIG. 2. Thus, the restraining portion 48a of the latch means 46 is normally biased into engagement with the switch actuators 32 and 34 to restrain relative rotation with respect to the shaft 28. If and when it becomes necessary to adjust the location of the switch actuators 32 and 34, the plate 48 is simply rotated clockwise by manual finger pressure from the position shown in FIG. 2 until the restraining portion 48a is disengaged from the slots 32c and 34c. After the adjustment has been accomplished, the plate 48 is allowed to return to its position with the restraining portion 48a engaged with the slots 32c and 34c.

Figure 3:
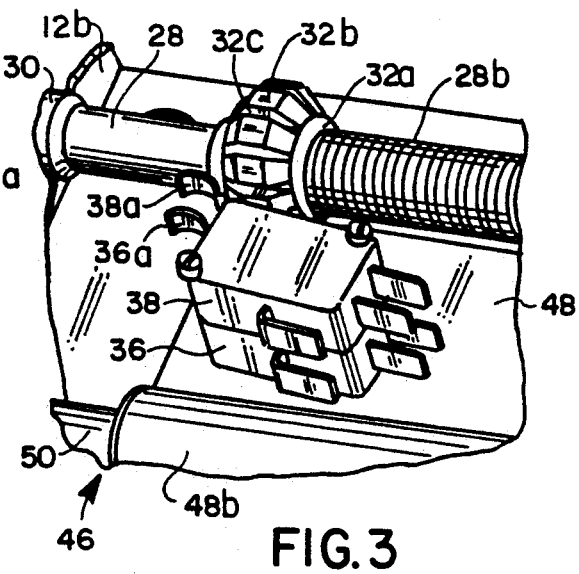
FIG. 3 is a fragmentary enlarged perspective view of a portion of the limit switch mechanism of FIG. 1.

With respect to the embodiment of FIGS. 1-3, it is noted that the four limit switches 36, 38, 40 and 42 are fixedly mounted on the bottom portion 12a of the frame 12 by posts 43, which extend through clearance openings in the plate 48. The switches 36 and 40 are the limit switches for the open and closed positions of the door 20. The switches 38 and 42 are typically used to disable the reversing function as the garage door 20 approaches the positions in which it is to remain open or closed until a further control signal is received. In many applications there is no need to adjust the relative positions of switch 38 with respect to switch 36 or switch 42 with respect to switch 40. Thus, in the embodiment of FIGS. 1-3 it is sufficient to adjust the switch actuators 32 and 34 with respect to limit switches 36 and 40 to set the proper door open and closed positions.

Figure 5:
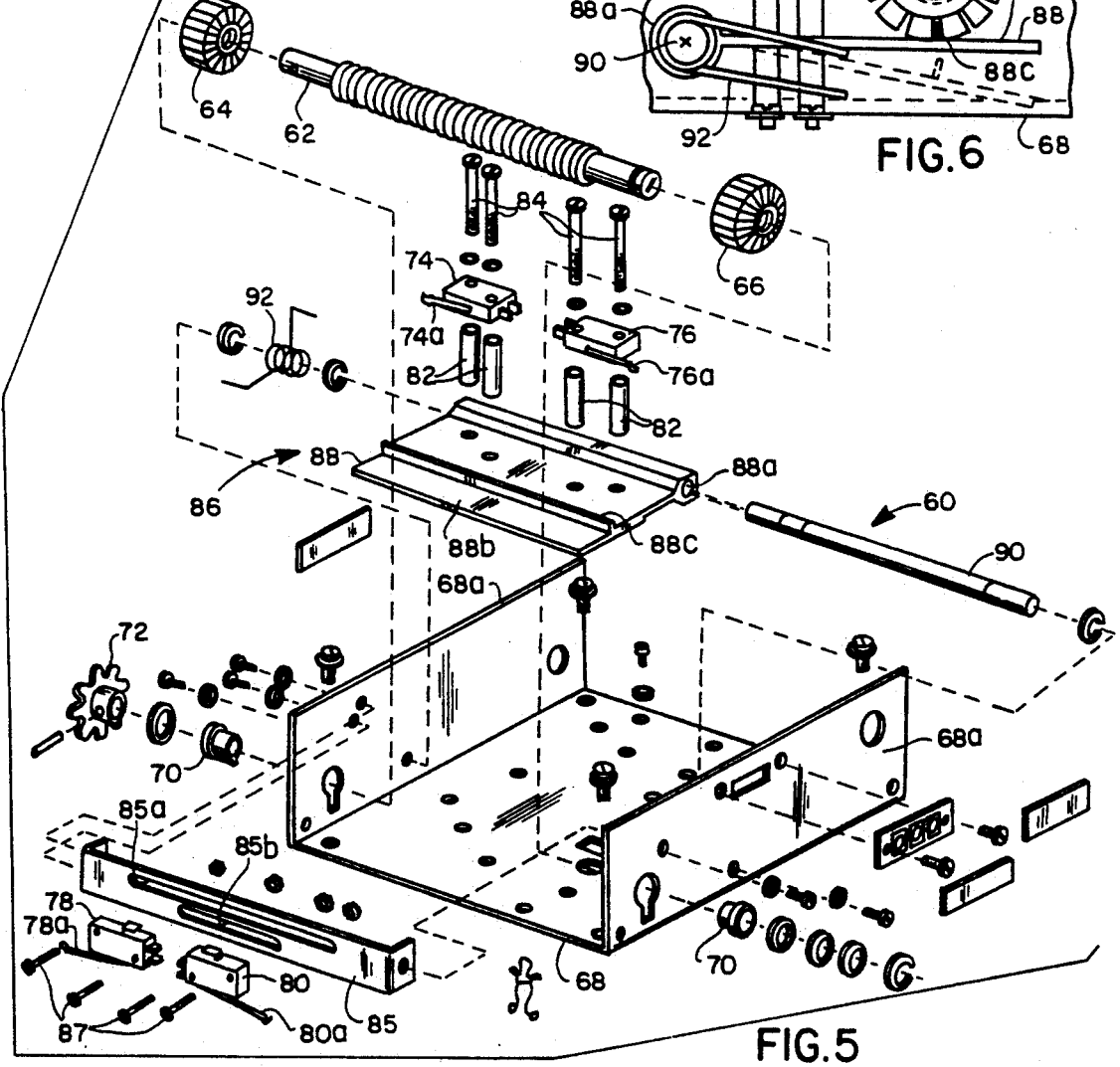
FIG. 5 is an exploded perspective of an alternative embodiment of the invention.

Referring now to the embodiment of FIGS. 4 and 5, there is shown a limit switch mechanism 60 which is generally similar to the embodiment of FIGS. 1-3, but includes some variations in the configuration of the latch and in the mounting of the various limit switches. The limit switch mechanism 60 includes a threaded shaft 62 which corresponds in function to the shaft 28 described in connection with the embodiment of FIGS. 1-3. Similarly, the limit switch mechanism 60 includes switch actuators 64 and 66 which correspond identically to the switch actuators 32 and 34 of the first embodiment. The threaded shaft 62 is mounted in a frame 68 having sidewalls 68a, in which journal bearings 70 are received to support threaded shaft 62 for rotation. A sprocket 72, keyed to the shaft 62, is driven by the above-described endless chain 26, which in turn is driven by the motor 18. Although not shown, a similar drive sprocket would be utilized to drive shaft 28 by chain 26.

In the embodiment of FIGS. 1-3, the four limit switches 36, 38, 40 and 42 were fixedly mounted with respect to the frame 12. In the embodiment of FIGS. 4 and 5, two of the limit switches are fixedly mounted, whereas two are adjustably mounted with respect to the frame 68. More specifically, the limit switch mechanism 60 includes fixedly mounted limit switches 74 and 76, and adjustably mounted limit switches 78 and 80. The limit switches 74 and 76 include control levers 74a and 76a and are supported by elongated posts 82. Elongated bolts 84 extend through the limit switches 74 and 76 and posts 82 into threaded engagement with the frame 68, to fixedly secure the switches 74 and 76 thereon.

The limit switches 78 and 80 are mounted on a transversely extending bracket 85 which is secured at its ends to the opposed walls 68a of the frame 68. As is best shown in FIG. 4, the bracket 85 is provided with slots 85a and 85b, through which assembly bolts 87 extend to secure the switches 78 and 80 with respect to the frame 68. The elongated slots 85a and 85b permit the limit switches 78 and 80 to be selectively positioned lengthwise of the shaft 62 and bracket 85 to adjust the relative positions at which the switches 78 and 80 will be actuated.

In order to restrain the switch actuators 64 and 66 from rotating with respect to the threaded shaft 62, there is provided a latch means 86 which performs the same function as the latch means 46 described in connection with the embodiment of FIGS. 1-3. The latch means 86 includes a plate 88, which is mounted for pivotal movement on a shaft 90, and is biased into engagement with the switch actuators 64 and 66 by means of a torsion spring 92. The plate 88 is formed of extruded metal and includes, along one edge thereof, a cylindrical portion 88a which receives the shaft 90. The edge of the plate 88 remote from the cylindrical portion 88a is formed with a manual actuating portion 88b. As is best shown in FIG. 5, the manual actuating portion 88b extends outwardly beyond the threaded shaft 62, permitting the operator or installer of the limit switch mechanism to apply a manual force downwardly on the plate 88 to disengage it from the switch actuators 64 and 66.

The plate 88 is formed intermediate the manual actuating portion 88b and the cylindrical bearing portion 88a with a restraining portion or edge 88c, which is adapted to insert into the slots in the switch actuators 64 and 66 in the same manner as the plate 48 engages the switch actuators 32 and 34 in connection with the embodiment of FIGS. 1-3. The torsion spring 92 is of similar configuration and function as the spring 52 described in the earlier embodiment.

Referring to the schematic circuit diagram of FIG. 7, there is shown the control circuit for a garage door opener which is typical of known prior art control circuits. The circuit itself forms no part of the present invention, the present invention being concerned solely with the limit switch mechanism which is mechanically driven by the motor 18, and which controls the electrical power to the motor. Typically, such a circuit includes a high voltage motor circuit 94 and a low voltage control circuit 96 which is powered through a step-down transformer 14. The limit switches 36, 38, 40 and 42 are connected to a radio control circuit element 98 and relays 100 and 102 in the manner shown. The relay 100 includes a coil 100a which cooperates switch contacts 100b by moving an armature 100c, while the relay 102 includes an operating coil 102a and switch contacts 102b operated by moving an armature 102c. The limit switch 36 is opened by switch actuator 32 to de-energize the relay 100 and open the circuit to the winding of motor 18, causing the door 20 to stop in the open position. The switch 38 is operated prior to the switch 36 to prevent reversal of the motor 18 as the door approaches the open position. The limit switch 40 is actuated by the switch actuator 34 to de-energize the relay 102 and open the circuit to the winding of motor 18, causing the door 20 to stop in the fully closed position. The limit switch 42 is operated prior to the switch 40 to prevent reversal of the motor 18 as the door approaches the closed position. The circuit 96 also includes a manually operable switch having sets of switch contacts 104 for initiating opening of the door 20 and switch contacts 106 for initiating closing of the door 20.

It should be appreciated that the limit switch mechanism 10 or the alternative embodiment limit switch mechanism 60 provides complete flexibility in the adjustment of the time of actuation of the limit switches in synchronism with the opening and closing of the door 20 by the motor 18. The switch actuators of the limit switch mechanism are easily adjusted when the door 20 is in the open or closed position by disengaging the latch means from the switch actuators and rotating them to reposition them axially on the threaded shaft to the switch actuating position. Such adjustment of the switch actuation positions may be accomplished by the unskilled non-professional who is often installing a garage door opener in his own garage. It is sufficiently simple that no detailed instruction or special tools are required.

What is claimed is:

1. A limit switch mechanism for controlling a motor over a selected range of movement comprising:

a support frame;

a shaft journaled at ends on said support frame for rotational movement about a first axis, said shaft being threaded between said journaled ends;

a first switch actuator and a second switch actuator threadedly received on said shaft, each switch actuator being generally cylindrical with an axially extending threaded bore and being formed with a plurality of radially extending slots equally spaced around the periphery and with at least one slot extending radially of said first axis, said slot having an outwardly facing mouth portion and being in a plane through said first axis;

a first limit switch and a second limit switch mounted on said support frame at opposite ends of said shaft, each said limit switch having control means operating one of said limit switches, said control means for said first limit switch being positioned in the path of said first switch actuator to operate said first limit switch upon axial movement of said first switch actuator toward one of said shaft ends, said control means for said second limit switch being positioned in the path of said second switch actuator to operate said second limit switch upon axial movement of said second switch actuator toward the other of said shaft ends;

latch means biased into engagement with said first switch actuator and said second switch actuator for engaging said slots to restrain rotation of said switch actuators while permitting axial movement of said switch actuators along said shaft upon shaft rotation; and manual actuation means connected to said latch means for permitting an operator of said limit switch mechanism to readily disengage said latch means from said first switch actuator and said second switch actuator, said manual actuation means comprising an operator accessible plate pivotally mounted about a second axis parallel with and spaced from said first axial and said latch means comprises a restraining portion affixed to said operator accessible plate which extends parallel to said first axis and is engageable with one of said slots in each of said first switch actuator and said second switch actuator to restrain rotary movement and permit axial movement along said shaft.

2. A limit switch mechanism for controlling a motor over a selected range of movement as recited in claim 1 further comprising a second shaft mounted in said support frame on a second axis, said operator accessible plate having lengthwise extending opposed edges, a tubular mounting portion formed on said operator accessible plate at one of said lengthwise extending opposed edges to receive said second shaft and pivotally mount said operator accessible plate with respect to said second shaft, said restraining portion being formed at the other of said lengthwise extending opposed edges and extending radially with respect to said first axis, and a torsion spring mounted on said second shaft in engagement with said support frame and said operator accessible plate to bias said restraining portion into engagement with said slots in said manual actuation means.

3. A combination limit switch mechanism and a garage door opener comprising:
a motor;
drive means for interconnecting said motor with said garage door to open and close said garage door;
a control circuit for said motor including a first limit switch and a second limit switch to de-energize said motor when said garage door has been driven to an open position and a closed position, respectively; and
a limit switch mechanism comprising
a frame,
a first shaft having end portions journaled in said frame for rotation about a first axis, said first shaft having a threaded portion between said end portions,
switch actuator means threadedly received on said threaded portion of said first shaft for actuating a switch, said switch actuator means comprising a first switch actuator and a second switch actuator, each of which includes a hub portion with a threaded bore and a peripheral portion which is segmented by equally spaced radially extending slots;
movable restraining means extending parallel to said first shaft and movable toward and away from said first shaft for selectively engaging said switch actuator means for restraining rotation and guiding said switch actuator means for axial movement on said first shaft as it rotates, said movable restraining means having a restraining edge extending parallel to said first axis, said restraining edge being movable radially of said first axis into engagement with a slot in each of said switch actuators;
means for holding said movable restraining means in an engaged position with said switch actuator means;
manual actuation means connected to said movable restraining means for permitting an operator of said limit switch mechanism to readily move said movable restraining means away from said first shaft, said manual actuation means comprising an operator accessible plate pivotally mounted on a second shaft supported by said frame and extending parallel to said first shaft, said restraining edge being formed on said operator accessible plate parallel to and spaced from said second shaft and being engageable in a slot in each of said switch actuators; and
means drivingly interconnecting said motor and said first shaft for driving said switch actuator means axially along said first shaft in response to said motor opening and closing said garage door;
said first limit switch and said second limit switch being supported on said frame adjacent said first shaft and being operable by said switch actuator means.

4. A limit switch mechanism for controlling a motor over a selected range of movement comprising:
a support frame;
an elongated shaft having end portions journaled in said support frame for rotation about a first axis, said elongated shaft having a threaded portion between said end portions;
means for drivingly connecting said elongated shaft to a motor to be controlled so that said motor rotates said elongated shaft;
an actuator being formed with a central hub having a threaded bore, said threaded portion of said elongated shaft being received in said threaded bore, said actuator having a slotted annular wall portion being divided into equal segments by slots which extend radially with respect to said elongated shaft;
movable restraining means extending parallel to said elongated shaft for moving toward and away from said elongated shaft and for selectively engaging one of said slots to restrain rotation of said actuator whereby rotation of said elongated shaft causes axial translation of said actuator on said elongated shaft, said movable restraining means comprising a restraining portion extending along the other of said parallel edges;
means for biasing said movable restraining means into engagement with said actuator;
manual actuation means connected to said movable restraining means for permitting an operator of said limit switch mechanism to readily move said movable restraining means away from said elongated shaft, said manual actuation means comprising an operator accessible plate member having two parallel edges with a journaled portion extending along one of said parallel edges,
a switch mounted on said support frame and connected in circuit to said motor to control operation of said motor, said switch having a control means positioned adjacent said threaded portion of said elongated shaft for engagement by said actuator as it translates axially on said threaded portion of said elongated shaft for controlling operation of said motor; and
a second shaft mounted on said support frame in spaced parallel relation to said elongated shaft, said second shaft extending through said journaled portion of said operator accessible plate member to support said operator accessible plate member pivotally with respect to said support frame, said movable restraining portion being selectively engageable with one of said slots to restrain rotation and guide said actuator in its axial translation on said threaded portion of said elongated shaft.

5. A limit switch mechanism for controlling a motor over a selected range of movement as recited in claim 4 wherein said biasing means comprises a torsion spring received on said second shaft engaging said operator accessible plate member and said support frame.

6. A limit switch mechanism for controlling a motor over a selected range of movement as recited in claim 4 wherein said operator accessible plate member includes a manual operating portion extending outwardly of said restraining portion and away from said journaled portion to be accessible for manual engagement to rotate said operator accessible plate member on said second shaft to disengage said restraining portion from said actuator.

7. A limit switch mechanism for controlling a motor over a selected range of movement as recited in claim 6 further comprising a third limit switch and a fourth limit switch mounted on said support frame each having control means, said third limit switch being positioned adjacent said first switch and having its control means positioned to be engaged by said first actuator, said fourth limit switch being positioned adjacent to a second switch and having its control means positioned to be engaged by a second actuator.

8. A limit switch mechanism for controlling a motor over a selected range of movement as recited in claim 7 wherein said limit switches are fixedly mounted on said support frame, said control means for said first and third switches being displaced axially with respect to said elongated shaft so that first actuator operates said first and third switches in spaced time sequence as said first actuator moves axially on said first shaft, said control means for said second and fourth limit switches being displaced axially with respect to said first shaft so that said second actuator operates said second and fourth limit switches in spaced time sequence as said second actuator moves axially on said first shaft.

9. A limit switch mechanism for controlling a motor over a selected range of movement as recited in claim 7 wherein said first and second switches are fixedly mounted on said support frame, said third and fourth limit switches being supported for adjustable mounting on a frame portion extending parallel to said first shaft, said third and fourth limit switches being movable in a direction parallel to said first shaft.

* * * * *